UNITED STATES PATENT OFFICE.

LYMAN P. CONVERSE, OF CHICAGO, ILLINOIS, ASSIGNOR TO WALLACE C. CONVERSE, OF SAME PLACE.

WATERPROOFING COMPOUND.

SPECIFICATION forming part of Letters Patent No. 594,935, dated December 7, 1897.

Application filed August 20, 1895. Serial No. 559,956. (No specimens.)

*To all whom it may concern:*

Be it known that I, LYMAN P. CONVERSE, a citizen of the United States, residing at Chicago, in the county of Cook and State of Illinois, have invented a new and useful Improvement in Waterproofing Compounds, of which the following is a specification.

The object of my invention is to provide a waterproofing compound particularly for application to cloth and textile fabrics generally, to render the latter suitable for manufacture into waterproof garments.

To produce my improved compound, I boil a suitable vegetable oil, preferably linseed-oil, at a temperature of from 500° to 600° Fahrenheit, or thereabout, for a prolonged period, say about six hours. While the oil is being thus boiled, the temperature should be raised to about 650° Fahrenheit. At the end of the boiling period the oil is cooled, with the result that it attains a consistency somewhat like that of thick molasses. To the cool oil I then add animal's blood in the proportion of about one part of the blood to three parts of the oil, and the mixture is thereupon cooked, preferably in a steam-jacketed kettle, at a temperature which need not exceed 212° Fahrenheit. The boiled mixture is then cooled, and in its cool condition I add a suitable quantity—say about one-fourth ($\frac{1}{4}$) the amount of oil used—of petrolatum, vaseline, cosmoline, or any other product of coal-oil which is an equivalent of petrolatum. The whole is then thoroughly mixed in its cold condition, and any desired coloring material may be added to it.

A compound thus produced may be applied to cloth by spreading it upon the surface of the latter and then drying it, and it affords a most effective and cheap waterproof coating on the cloth. The oil forms the main body of the compound. The blood acts as a thickener and lends flexibility to the compound when applied as a coating, and the petrolatum increases the flexibility and tends to keep the coating soft in cold weather.

The proportions mentioned may be materially changed without departing from my invention.

What I claim as new, and desire to secure by Letters Patent, is—

1. A waterproofing compound composed of a mixture of boiled vegetable oil, animal's blood and petrolatum, or its equivalent, substantially in the proportions specified.

2. A waterproofing compound composed of a mixture of boiled vegetable oil, animal's blood, petrolatum or its equivalent, and coloring-matter, substantially in the proportions specified.

LYMAN P. CONVERSE.

In presence of—
J. N. HANSON,
J. H. LEE.